United States Patent
Hughes et al.

(10) Patent No.: US 9,690,784 B1
(45) Date of Patent: Jun. 27, 2017

(54) CULTURALLY ADAPTIVE AVATAR SIMULATOR

(71) Applicant: University of Central Florida Research Foundation, Inc., Orlando, FL (US)

(72) Inventors: Charles E. Hughes, Maitland, FL (US); Tracy St. Benoit, Stone Mountain, GA (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 569 days.

(21) Appl. No.: 14/216,060

(22) Filed: Mar. 17, 2014

Related U.S. Application Data

(60) Provisional application No. 61/788,027, filed on Mar. 15, 2013.

(51) Int. Cl.
*G06F 3/048* (2013.01)
*G06F 17/30* (2006.01)
*G06F 3/0481* (2013.01)

(52) U.S. Cl.
CPC ............ *G06F 17/30* (2013.01); *G06F 3/0481* (2013.01)

(58) Field of Classification Search
CPC G06T 13/40; G06T 13/00; G06T 7/20; G06T 7/2006; G06F 17/289; G06F 3/048; G06F 3/011; G06F 3/017; G06Q 30/0242
See application file for complete search history.

(56) References Cited

U.S. PATENT DOCUMENTS

| | | | |
|---|---|---|---|
| 8,098,905 B2* | 1/2012 | Amento | G06T 13/40 382/118 |
| 9,329,743 B2* | 5/2016 | Shuster | A63F 13/12 |
| 2008/0059570 A1* | 3/2008 | Bill | G06Q 10/10 709/203 |
| 2009/0165140 A1* | 6/2009 | Robinson | G06Q 30/02 726/26 |
| 2009/0325701 A1* | 12/2009 | Andres Del Valle | A63F 13/12 463/36 |
| 2011/0225515 A1* | 9/2011 | Goldman | G06Q 10/10 715/757 |
| 2011/0298827 A1* | 12/2011 | Perez | G06K 9/00355 345/647 |
| 2012/0192088 A1* | 7/2012 | Sauriol | G06F 3/012 715/757 |

(Continued)

OTHER PUBLICATIONS

Xiaoli Yang et al., Hierarchical Animation Control Avatars in 3-D Virtual Environments, IEEE, Jun. 2005.*

(Continued)

*Primary Examiner* — Tadeese Hailu
(74) *Attorney, Agent, or Firm* — Anton J. Hopen; Andriy Lytvyn; Smith & Hopen, P.A.

(57) ABSTRACT

An avatar interaction system that solicits the end user to provide a cultural profile and automatically filters or translates responses through the avatar in a manner compatible with the cultural profile designated. End users may selected from a plurality of gender, race, and ethnically identifiable anthropomorphic forms to self-identify with a cultural profile. Gestures having cultural significance are identified, suppressed, and/or modified according to the currently enabled cultural profile of the end user.

19 Claims, 9 Drawing Sheets

(56) References Cited

U.S. PATENT DOCUMENTS

| | | | | |
|---|---|---|---|---|
| 2014/0004487 A1* | 1/2014 | Cheben | ............... | G06F 3/011 434/219 |
| 2015/0325029 A1* | 11/2015 | Li | ..................... | G06T 13/40 382/103 |
| 2016/0086366 A1* | 3/2016 | Crutchfield, Jr. | ...... | G06N 3/006 345/473 |

OTHER PUBLICATIONS

Masashi Okubo et al., Effects of InterActor's Nodding on a Collaboration Support System, IEEE, 2005.*

Bo Mu et al., Implementation of the Interactive Gesture of Virtual Avatar Based on a Multi-user Virtual Learning Environment, 2009.*

Department of Defense Annual Report on Sexual Assault in the Military: Fiscal Year 2010. Dated Mar. 2011.

Sturman, D.J.: Computer Puppetry. Computer Graphics and Applications 18(1), 38-45 (1998).

Hyun Joon Shin, Jehee Lee, Sung Yong Shin, and Michael Gleicher. 2001. Computer puppetry: An importance-based approach. ACM Trans. Graph. 20, 2 (Apr. 2001), 67-94.

Lee, J., Chai, J., Reitsma, P.S.A., Hodgins, J.K., Pollard, N.S.: Interactive Control of Avatars Animated with Human Motion Data. In: Proceedings of the 29th Annual Conference on Computer Graphics and Interactive Techniques (SIGGRAPH 2002), San Antonio, pp. 491-500. ACM Press, New York (2002).

Rizzo, A; Newman, B.; Parsons, T.; Difede, J.; Reger, G.; Holloway, K.; Gahm, G.; McLay, R.; Johnston, S.; Rothbaum, B.; Graap, K.; Spitalnick, J.; Bordnick, P., "Development and Clinical Results from the Virtual Iraq Exposure Therapy Application for PTSD," Virtual Rehabilitation International Conference, 2009, vol., No., pp. 8,15, Jun. 29, 2009-Jul. 2, 2009.

M. Schmid, et al., Combating a Different Enemy: Proposals to Change the Culture of Sexual Assault in the Military. 55 Vill. L. Rev. 475, 2010.

C. E. Hughes and D. P. Mapes, "Mediated Dialogues through Multiple Networked Avatars," Journal of Immersive Education (Presented at iED 2012, Boston, Ma, Jun. 14-16).

A. Nagendran, R. Pillat, A. Kavanaugh, G. Welch, & C. E. Hughes (2014). "A Unified Framework for Individualized Avatar-Based Interactions," Presence: Teleoperators and Virtual Environments 23(2), 109-132.

Department of Defense Annual Report on Sexual Assault in the Military Service Academies: Academic Program Year 2011-2012. Dated Dec. 2012.

J. Krulewitz, et al., Reactions to Rape Victims: Effects of Rape Circumstances, Victim's Emotional Response, and Sex of Helper. Journal of Counseling Psychology, vol. 29, No. 6, 645-654, 1982.

R. Kimerling, et al., Military Sexual Trauma and Patient Perceptions of Veteran Health Administration Health Care Quality. Women's Health Issues 21-4S (2011) S145-S151.

R. Campbell, et al., The Sexual Assault and Secondary Victimization of Female Veterans: Help-Skeeing Experiences with Military and Civilian Social Systems. Psychology of Women Quarterly, 29 (2005) 97-106.

J. Turchik, et al., Sexual Assault in the U.S. Military: A review of the literature and recommendations for the future. Aggression and Violent Behavior 15 (2010) 267-277.

* cited by examiner

CULTURALLY ADAPTIVE AVATAR SIMULATOR

BACKGROUND OF THE INVENTION

1. Field of the Invention

This invention relates to computer simulations. More specifically, it relates to providing an interactive, culturally aware semi-automated anthropomorphic avatar that audibly and visually engages an end user for training and counseling purposes.

2. Brief Description of the Related Art

Foundational research and current applications of avatar-based training originates from using virtual humans driven by artificial intelligence ("AI") algorithms in simulated environments. In replicating human-to-human interactions in language, socio-cultural, and situational awareness training, the focus has been on the trainee interacting with a scripted, decision-tree based, virtual human "conversation."

Responses to queries from the human trainee are limited to the robustness of the AI and cannot be easily changed without modifying the underlying system. Although AI based training has its value it has its limitations in truly replicating the nuances found in real human-to-human communication. In addressing the growing demand for replicating the complex, and adaptable nature of human behavior and communication styles, another approach has evolved. In some training systems, human avatars or "human in the loop" systems have replaced AI-driven virtual humans.

The human embodied avatar is well suited for emotionally complex and sensitive human interactions that cannot be replicated in a scripted AI-driven system. Inclusion of a human in the virtual environment allows the trainee to experience a full range of human emotions and non-verbal cues in a truly individualistic experience not limited by scripted responses. The inhabited avatar responds like a real human being in real time.

Currently available technology, such as the semi-automated digital puppetry control provided by the AMITIES system, demonstrates in principal the unique capabilities of human inhabited avatars. One human actor is able to "inhabit" several virtual students with their own unique personalities and provides the teacher trainee, in a virtual classroom the experience and challenge of working with middle school age children. Each training session is unique since the human actor can change at any time the response and behavior of the inhabited avatars.

The US military is currently facing a substantial issue across the services: according to the recently released Pentagon document *The Department of Defense Report on Sexual Assault in the Military for FY*2010, over 19,000 servicemen and servicewomen have been sexually assaulted. The military has sexual assault and rape prevention training in place and augments their course material with virtual humans in simulated environments. Despite the sophistication of these virtual human systems, the military has recognized that existing technology and AI-driven avatars are not flexible enough to portray realistically the crucial critical thinking and counseling skills required to understand such an emotionally charged and sensitive topic.

Inhabited avatar training systems can achieve a higher level of cognitive process and receptivity to emotional cues through the combination of simulation technology and real human in the loop integration. Only humans can provide an experience that is spontaneous, improvised, and responsive to each individual participant's personality and communication style.

However, in view of the art considered as a whole at the time the present invention was made, it was not obvious to those of ordinary skill in the field of this invention how the shortcomings of the prior art could be overcome.

BRIEF SUMMARY OF THE INVENTION

The present invention includes a system for culturally sensitive avatar interaction. A simulated interaction between an end user at a first communications point and an interactor at a second communications point is established, typically through a local area network (LAN) or a wide area network (WAN). The interactor partially or fully controls an anthropomorphic avatar which is digitally displayed to the end user at the second communications point. The display may be a computer monitor, tablet device or smartphone.

Unlike AI-driven virtual humans, this invention can replicate real communication through a versatile avatar interface that can provide the level of behavioral realism and mimic the linguistic, emotional, and cognitive fragmentation that can happen during an intense, emotional encounter with the victim of a sexual assault. The full spectrum of human emotions through verbal and non-verbal cues can be recreated and modified during the training scenario so not only can the trainee have a training experience individualized to his or her strengths and weaknesses, but can also receive immediate feedback based on the avatar's response to the level trainee's performance during the simulated counseling session.

A first bidirectional communication link is created between the first communication point and the second communications point, the bi-directional communication link conveys text, audio, and/or video between the end user and the interactor. In an embodiment of the invention, the interactor sees video of the end user, but the end user only views the avatar as controlled by the interactor. The avatar is conveyed via a second unidirectional communication link between the first communication point and the second communication point. The avatar may be rendered as a media stream at the end user's computing device or, in alternative, the interactions may be reduced to an instruction set and invoked on the end user's local client device.

A cultural profile is applied to the end user at the first communications point: the cultural profile is representative of attributes of the end user including race, gender, and ethnicity. This cultural profile may be determined based on the end user's known identity. Alternatively, the end user may be directly queried for cultural profile data. Yet another alternative is to present a plurality of culturally identifiable avatars to the end user and require the end user to select the one that best identifies with the end user.

A data store of culturally sensitive interaction profiles associated with the cultural profile applied to the end user is communicatively coupled to the second communications point. The culturally sensitive interactions include gestures, poses, dress, and dialog conveyed by the interactor through the avatar. A non-transitory, computer readable media stores instructions to automatically detect culturally sensitive interactions invoked by the interactor through the avatar according to the cultural profile. Finally, warnings, filters, and even gesture translations are generated responsive to the detection of a culturally sensitive interaction.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
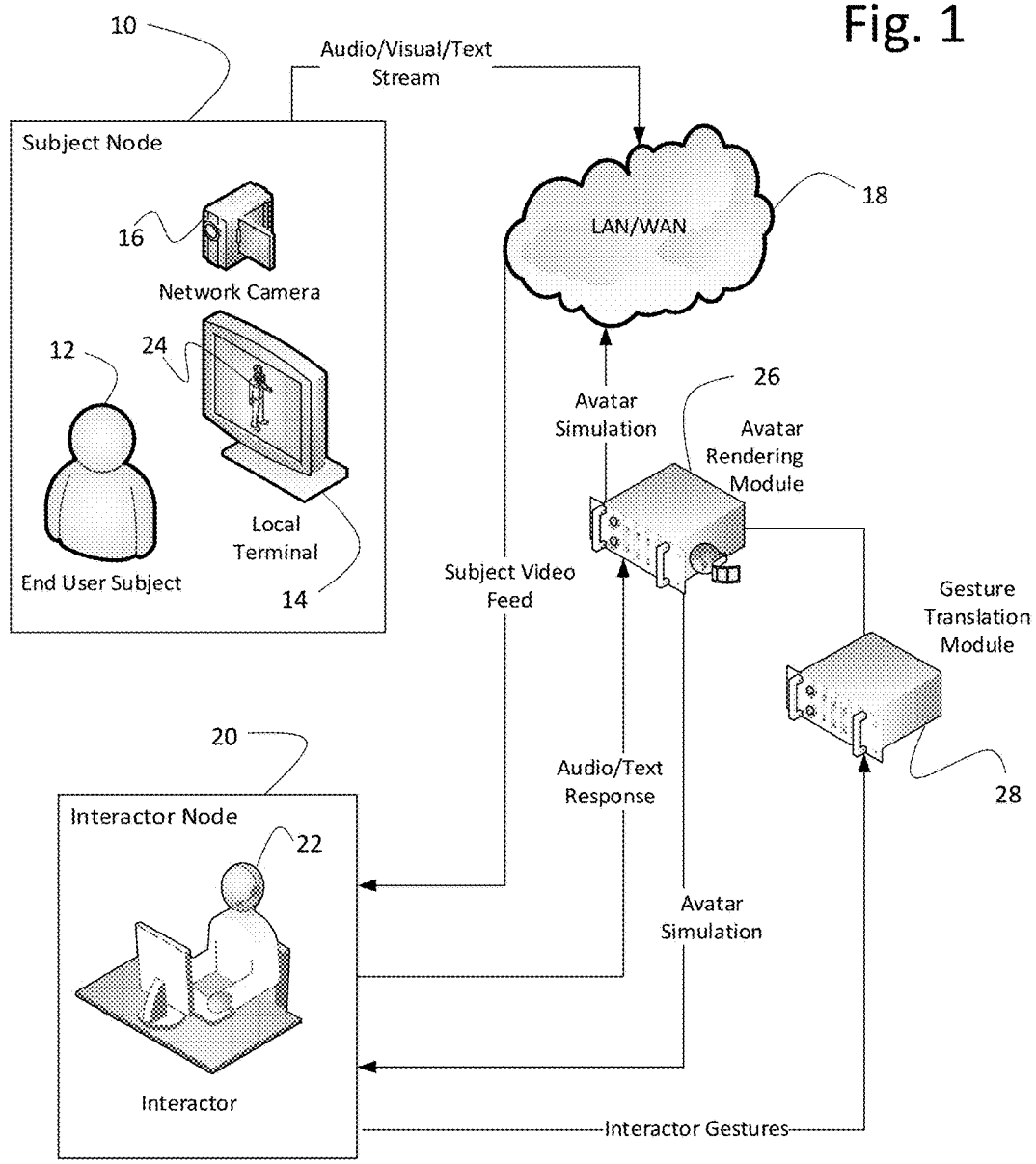
FIG. 1 is a diagrammatic view of an embodiment of the invention.

Referring first to FIG. 1, a subject node 10 contains an end-user subject 12, a local video terminal 14, and a network camera 16. Network camera 16 captures the audio and video of the subject (generally torso area) and transmits the information over a LAN/WAN connection 18 to an interactor node 20. Interactor node 20 is operated by an interactor 22, who is digital puppeteer of an avatar 24 displayed through a local terminal to end-user subject 12. Interactor 22 is generally equipped with a headset that provides hands-free headphones and a microphone. Interactor 22 may speak with end-user subject 12 through this headset over LAN/WAN connection 18. Concurrent with the audio interaction between end-user subject 12 and interactor 22, interactor 22 also manipulates avatar 24 that appears before the end-user subject 12. Avatar 24 is rendered via an avatar-rendering module 26 capable of invoking different gestures, postures, and facial expressions.

Interactor 22 may manipulate avatar 24 by a number of means including motion detected gesturing, selecting pre-defined micro-poses, predefined gesturing, or the like. Interactor 22 may have an array of movements that trigger predefined gestures via a gesture translation module 28. For example, a motion detection and capture device may detect when the interactor makes an "OK" sign. The gesture translation module then instructs avatar-rendering module 26 to have avatar 24 make the "OK" sign with its hand, smile broadly and straighten its posture for a predefined wait loop before returning to a default posture.

Figure 2:
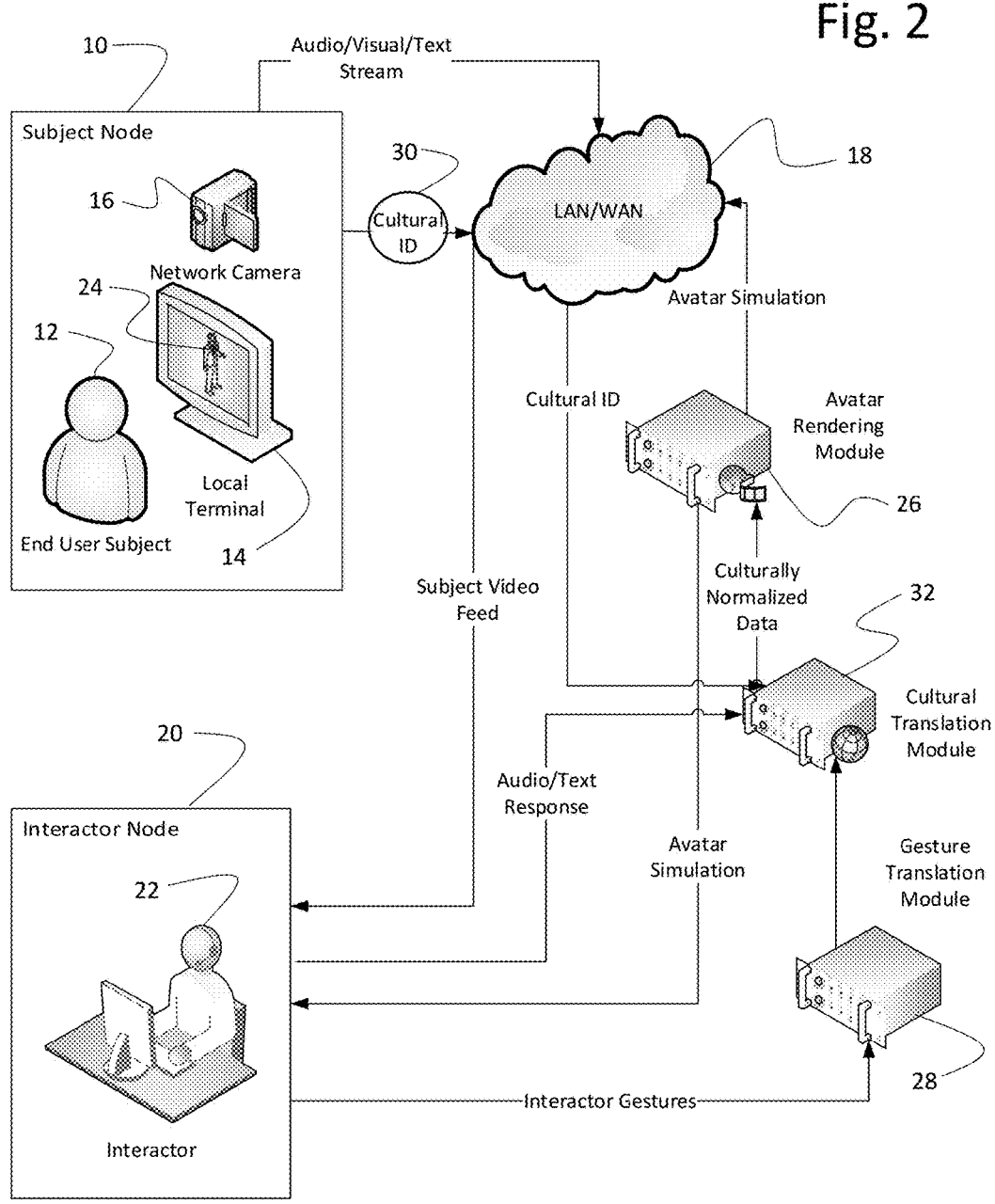
FIG. 2 is a diagrammatic view of an alternative embodiment of the invention.

In FIG. 2, a cultural ID 30 is retrieved from end-user subject 12, where cultural ID 30 is linked to a cultural translation module 32. Cultural ID 30 may be a primary key linked to a table of cultural profiles that include religious, ethnic, institutional rank, race, gender, and other factors. Cultural translation module 32 intercepts gestures invoked by interactor 22 and determines how they should be conveyed. Going back to the previous example, in middle-eastern countries the "OK" sign may be viewed as lewd and/or offensive. Cultural translation module 32 may handle the gesture in a number of ways. If cultural ID 30 of end user subject 12 indicates that the culture is agnostic to the gesture then the gesture may be conveyed unfiltered. If cultural ID 30 of end user subject 12 indicates the gesture is positive in the associated culture, then cultural translation module 32 will shows avatar 24 smile, straighten up, and invoke the "OK" sign gesture. If cultural ID 30 of end user subject 12 indicates the gesture is offensive in the associated culture, then cultural translation module 32 will show avatar 24 scowl, take an aggressive posture and invoke the "OK" sign gesture as an insult. Finally, cultural translation module 32 may warn interactor 22 that the gesture will be deemed offensive and not immediately convey it to end user subject 12 unless interactor 22 acknowledges the warning.

Figure 3:
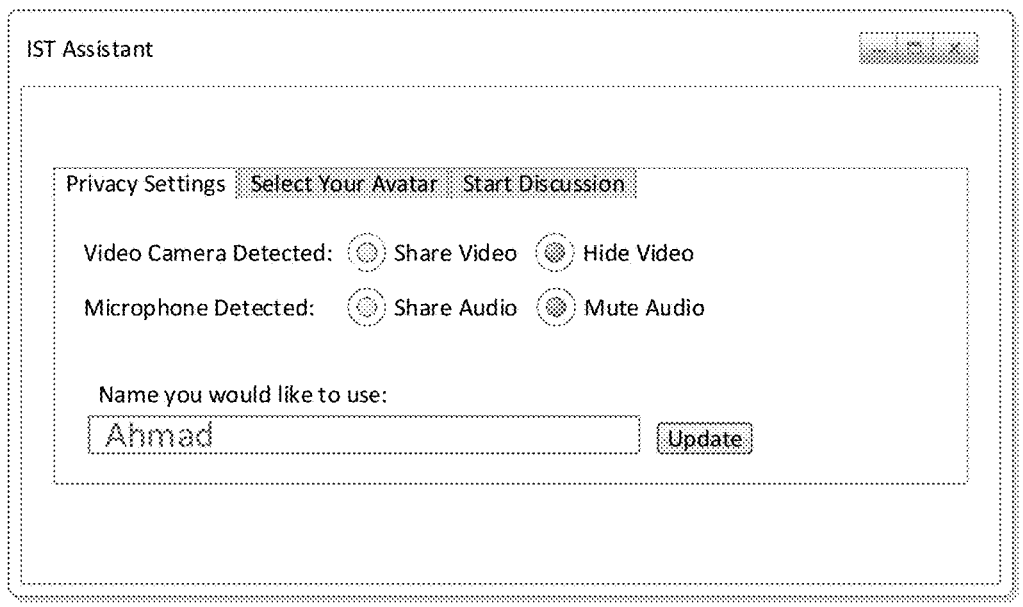
FIG. 3 is a GUI dialog box for privacy settings according to an embodiment of the invention.
Figure 4:
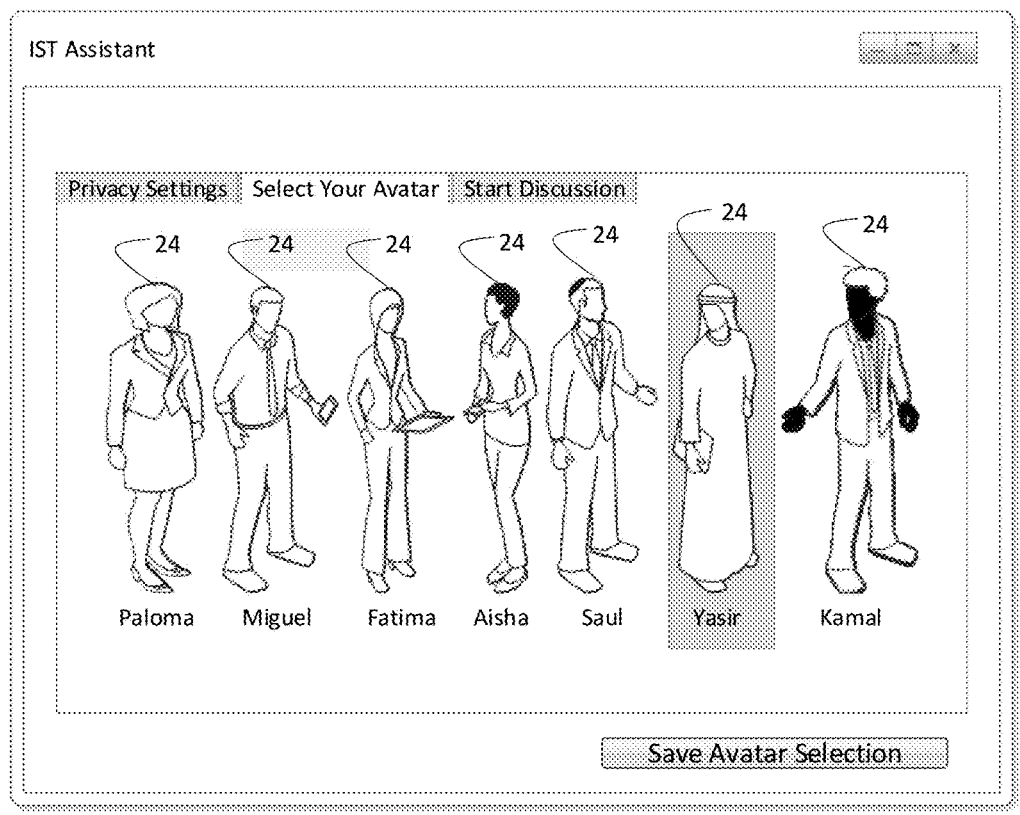
FIG. 4 is a GUI dialog box for selecting a culturally recognizable avatar.
Figure 5:
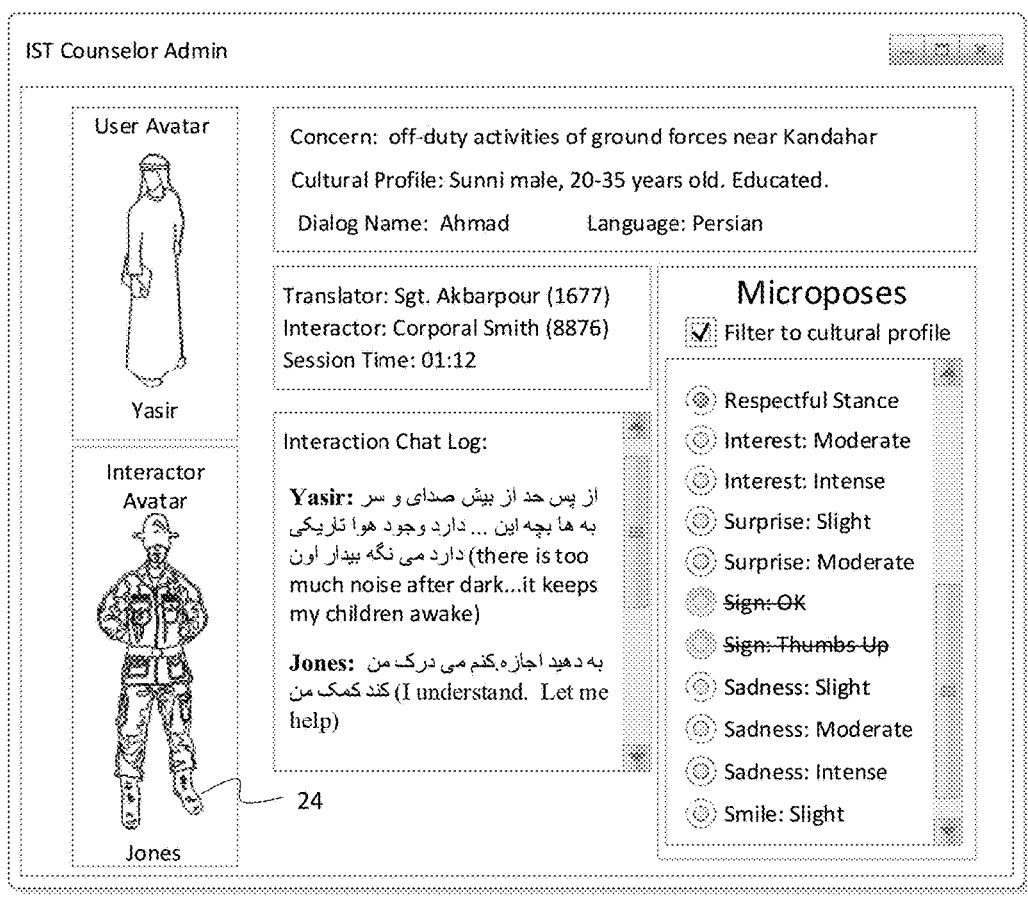
FIG. 5 is a GUI dialog box showing an avatar-based interaction between an end-user and an interactor.

An embodiment of the invention is shown in FIGS. 3-5 as application screen shots from a graphic user interface (GUI). In FIG. 3, a middle-eastern citizen wishes to communicate with foreign military forces anonymously. Therefore, in the privacy settings, the video camera and microphone are disabled and the citizen is permitted to use an arbitrary name to initiate the dialog (in this case, "Ahmad").

In FIG. 4, "Ahmad" is presented with a plurality of avatars 24. Ahmad is most likely to select avatar 24 with which he most closely identifies. For the sake of example, assume that Ahmad is a well-educated, young Muslim physician. In FIG. 4, the avatar named Paloma is represented as a Hispanic woman. Miguel is a Hispanic male. Fatima is a Muslim female. Aisha is a Caucasian female. Saul is a Jewish male. Yasir is a Muslim man. Kamal is an African-American male. Ahmad selects the Yasir avatar noting that the avatar's name, dress, and gender are most consistent with Ahmad's true cultural background.

In FIG. 5, a GUI screen is shown as might be viewed by interactor 22 on the other side of the dialog with Ahmad. In this example, interactor 22 is Army Corporal Smith assisted by Army Sgt. Akbarpour. Smith is responsible for avatar 24 gesturing and posing and Akbarpour engages in a text chat dialog with Ahmad in Farsi. Smith sees real-time translation of the Farsi (or Persian) to English so that he can convey the proper gesturing. In the example, shown, Smith selects a respectful stance from a plurality of gesture options. However, it should be noted that certain gestures are disabled because they are offensive to the cultural profile of Ahmad, namely, signing "OK" or signing "thumbs up."

Figure 6:
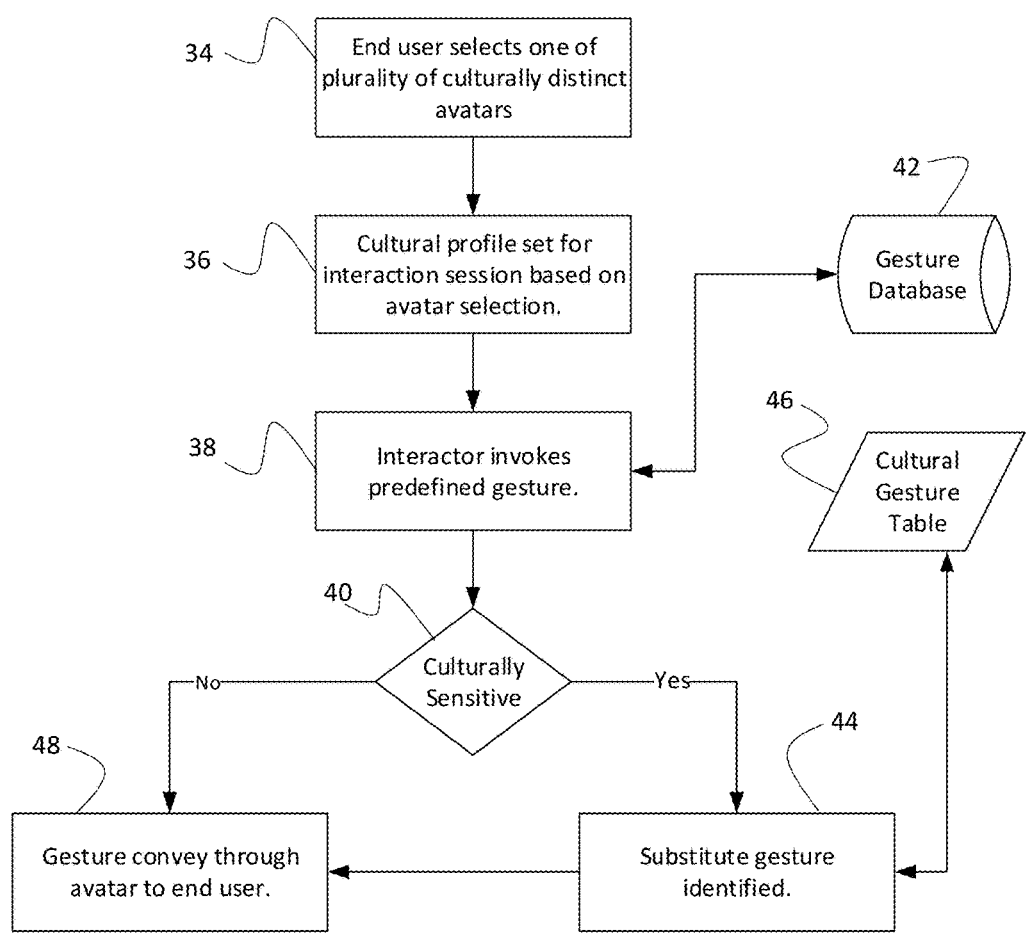
FIG. 6 is a flow-chart showing a method for detecting culturally sensitive gestures.

In FIG. 6, a workflow of an embodiment of the invention starts with end user subject 12 selecting one of a plurality of culturally distinct avatars 24 in step 34. While end user subject 12 could be presented with various GUI controls that query race, gender, and other factors, an advantage of the present invention is to reduce the necessary input required by end user subject 12 by presenting a stereotypic culturally recognizable profile avatar 24. It is noted that the profile avatar 24 should be visually depicted carefully to avoid excessive stereotyping, which may be misinterpreted. Therefore, as shown in the figures, avatars 24 may purposively lack a certain amount of detail in face, dress and body dimensions. In other words, avatars 24 are culturally and gender distinct, but otherwise neutral anthropomorphic forms.

Continuing reference to FIG. 6, a cultural profile is set in step 36. When interactor 22 invokes a predefined gesture in step 38, the gesture is checked for cultural sensitivity in step 40. This may be accomplished by comparing the gestures with the predefined gestured stored in a gesture database 42. If the query against gesture database results in a determination that the proposed gesture could be deemed culturally sensitive or offensive, a substitute gesture is identified in step 44 by selecting a culturally acceptable gesture from cultural gesture table 46. The substitute gesture is conveyed to the end user subject 12 through avatar 24 in step 48.

Figure 7:
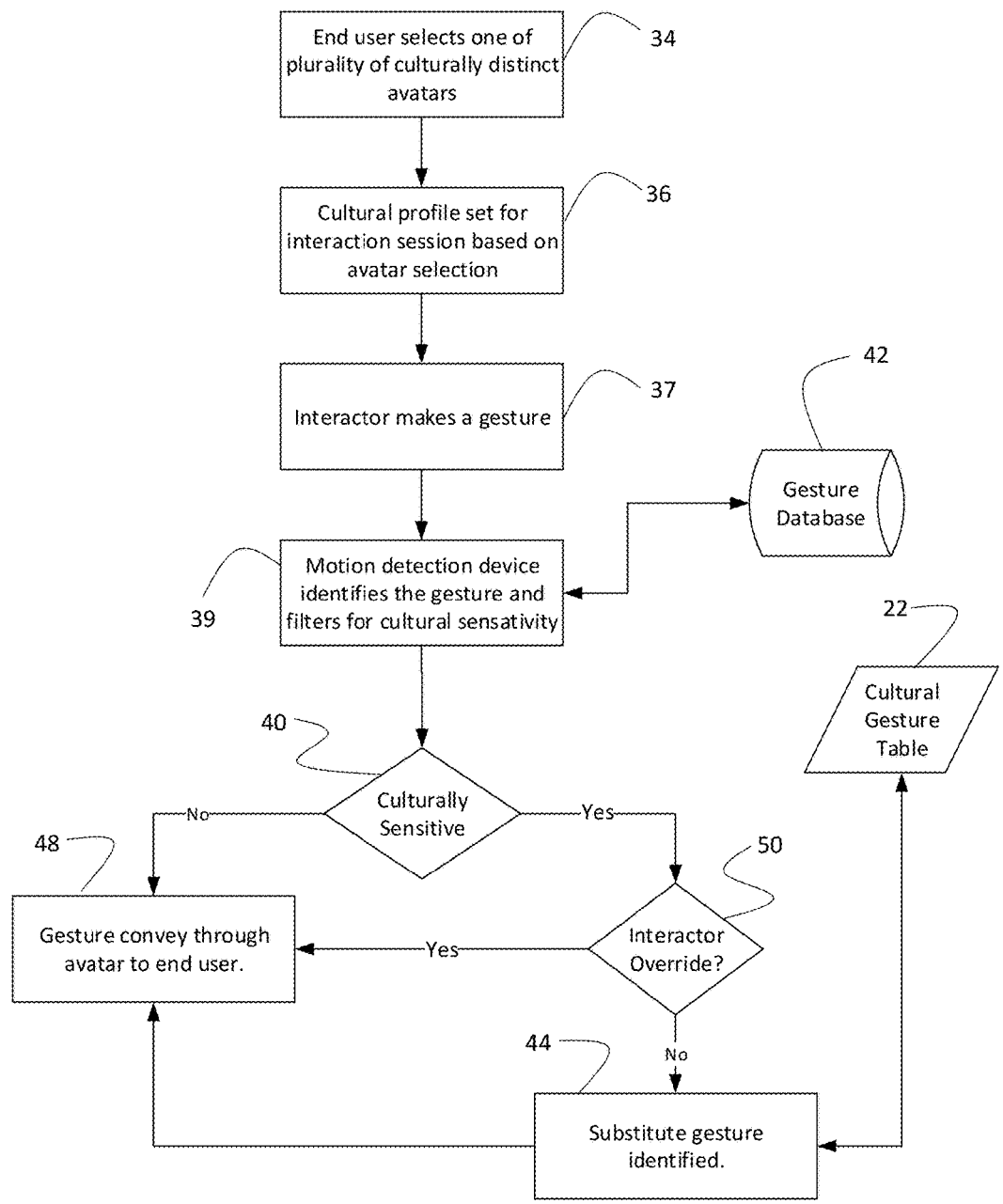
FIG. 7 is a flow-chart showing a method for detecting culturally sensitive gestures using motion detection capture.

FIG. 7 is schematically depicts a process similar to the process shown in FIG. 6, but adds motion detection of interactor's 22 physical gesturing in step 37. In this embodiment, interactor 22 is not limited to a set of predefined gestures. In step 39, a motion detection device identifies the gestures and motions of interactor 22 and filters for cultural sensitivity in step 39. This embodiment of the invention has an option to permit interactor 22 to override the substitute gesture in step 50. For example, gesturing with a middle finger may be deemed offensive in Western cultures, but interactor 22 may be engaging in training with end-user subject 12 to tolerate offensive behaviors. Therefore, interactor 22 overrides the warning to convey the gesture as intended.

Figure 8:
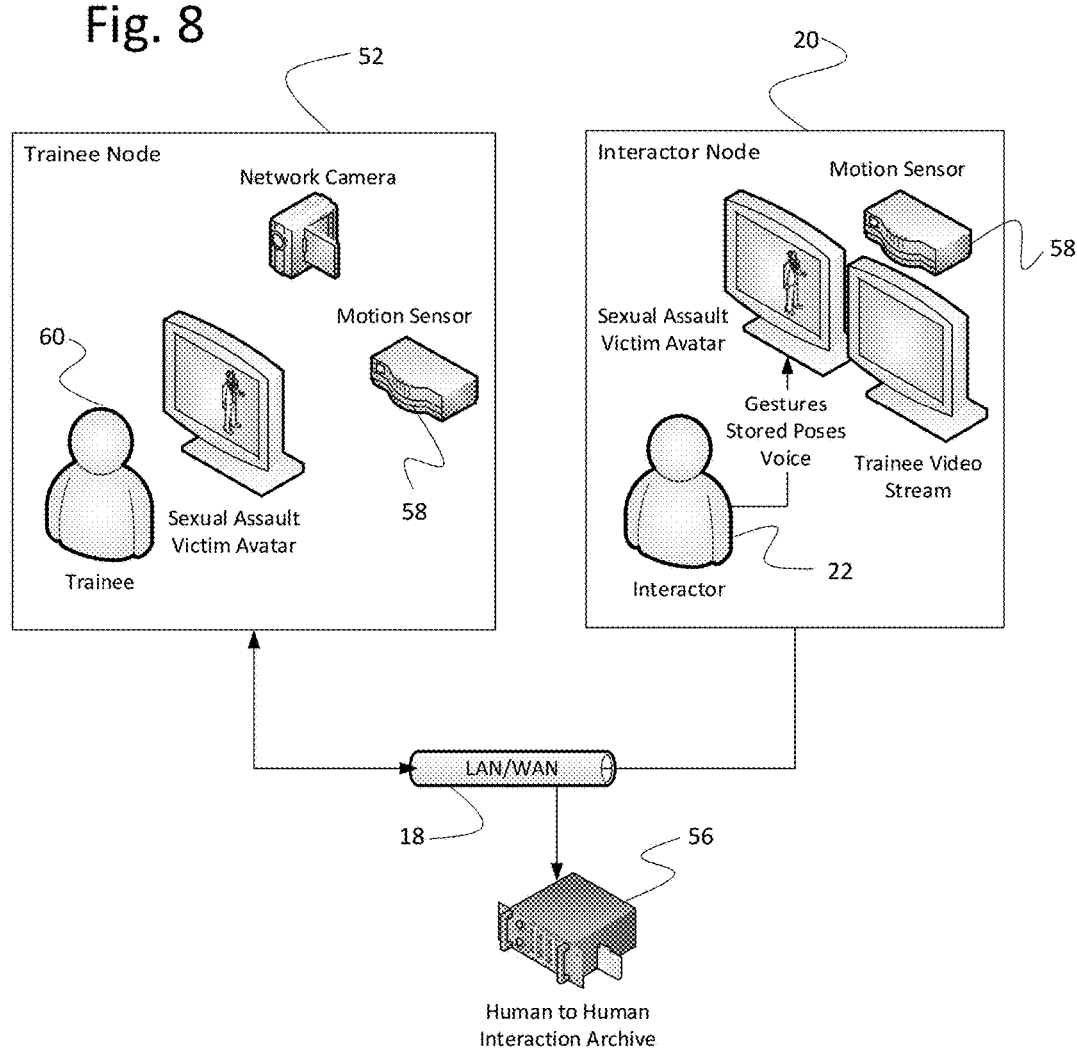
FIG. 8 is a diagrammatic view of an embodiment of the invention for training counselors of sexual assault.

FIG. 8 shows a trainee node 52 and interactor node 20 connected through LAN/WAN connection 18, wherein the human-to-human interaction is archived to a database store 56. A first motion sensor 58 at trainee node 52 saves gestures by a trainee subject 60, while second motion sensor 58 at interactor node 20 saves gestures by exhibited by interactor 22. By archiving accumulated gestures over many interactions, archive database store 56 facilitates more granular, organic, and unique stored gestures (or micro-poses) based on the context of the interaction.

Figure 9:
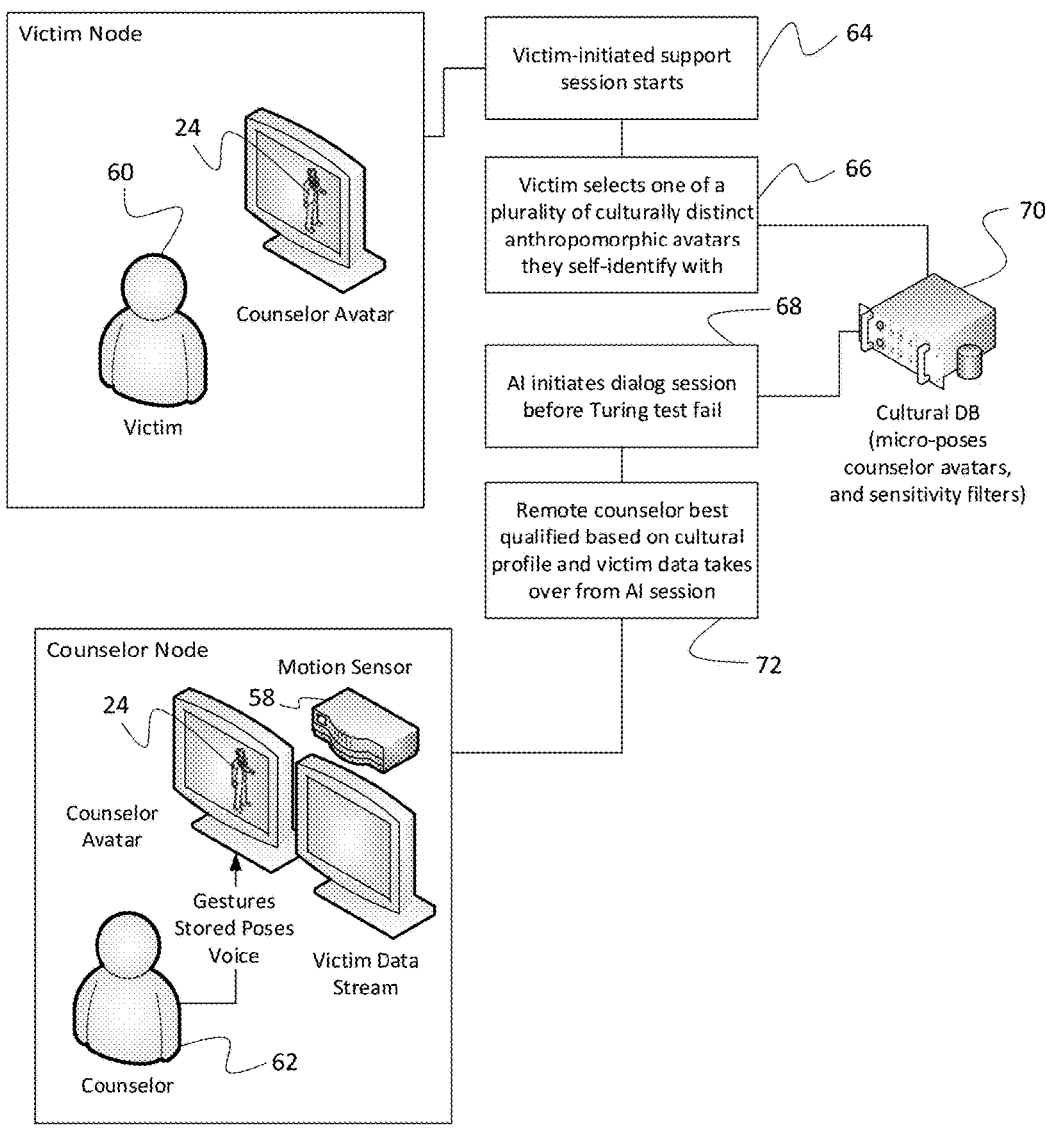
FIG. 9 is a diagrammatic view of alternative embodiment of the invention for counseling victims of sexual assault.

FIG. 9 shows an embodiment of the invention that could be used for counseling in situations where the issue is highly personal and culturally sensitive. A victim 60 of a crime may feel uncomfortable interacting with a counselor 62 of a certain gender, ethnicity, or cultural background. For example, a victim of sexual assault may be apprehensive about interacting with a male counselor. To ameliorate victim's 60 concerns, victim 60 can select virtual avatar 24 that puts victim 60 at ease and establishes rapport. This increases the comfort level of victim 60 and improves the likelihood of a positive outcome of the counseling session.

Continuing reference to FIG. 9, victim 60 initiates a counseling session using artificial intelligence (AI) in step 64. In step 66, victim 60 selects avatar 24 with whom victim 60 feels most comfortably. Since the initial stages of the counseling session are usually dedicated to establishing rapport and gather initial information, an artificial intelligence may fully control avatar 24 in step 68 based on the sensitivity filters and micro-poses associated with selected avatar 24 stored in a cultural database 70. The system may be programmed to permit interactions between victim 60 and the artificial intelligence while those interactions satisfy the Turing test.

Once the counseling session enters its substantive stages, the system can detect a failure of Turing test in step 68. At this point, a human counselor 62 takes full control of avatar 24 in step 72. The information gathered during the initial stage of the interaction between victim 60 and AI may be used to identify which counselor 62 is best suited to conduct the counseling session with victim 60. Once counselor 62 is assigned to the counseling session, counselor 62 seamlessly inhabits avatar 24 that was initially under AI control. The initial AI interaction provides time to engage victim 60 in an initial dialog and get victim 60 invested in the interaction while human counselor 62 is assigned and brought online into the discussion.

Hardware and Software Infrastructure Examples

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages. Rendering of visual data, e.g., virtual avatars of 2D displays or virtual imagery on robotic avatars, may be done directly, through low-level libraries such as OPENGL and DIRECTX3D, or through higher-level graphics and gaming engines, such as OGRE3D or UNITY3D.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

GLOSSARY OF CLAIM TERMS

Anthropomorphic avatar—a digital representation of a human-like figure outputted to the end user. The avatar may be a vector shape capable of conveying a plurality of gestures/movements. The avatar may have the following culturally-adaptive characteristics: attire, race, ethnicity, gender, age, etc. The avatar may be controlled by a human interactor, and artificial intelligence, or a combination thereof.

Bidirectional communications link—a communications channel that connects two or more communication points enabling each communications point to send, receive, and forward information.

Communications point—an active electronic device that is attached to a network, and is capable of sending, receiving, or forwarding information over a communications link.

Cultural profile—a set of characteristics associated with the selected avatar, these may include race, gender, age, ethnicity, attire, etc.

Culturally benign interaction—a gesture, a word, or an expression that carries an meaning in a specific culture different from the literal translation, wherein the culture-specific meaning is not defined as offensive.

Culturally offensive interaction—a gesture, a word, or an expression that carries an offensive meaning in a specific culture different from the literal translation.

Culturally sensitive gesture—a gesture that carries a specific meaning in a certain culture. Culturally sensitive gestures may carry a positive, benign, or offensive meaning.

Culturally sensitive interaction—a gesture, a word, or an expression that carries a meaning in a specific culture other than the literal translation. Culturally sensitive interaction may be positive, benign, or offensive.

End user—a user at a communications point receiving digital representation of an avatar at a first communications point, wherein the avatar is controlled either by a human interactor at another communications point, an artificial intelligence, or a combination thereof. The end user sends information via a communications link to the human interactor.

Gesture—a movement of part of the body, especially a hand or the head, to express an emotion, a feeling, or an idea.

Gesture database—a database containing a plurality or predefined gestures.

Interactor—a user at a communications point interacting with the end user by receiving data from and sending data to the end user. The interactor is capable of sending and receiving audio, video, text, and avatar gestures to the end user. The interactor partially or fully controls the avatar. The interactor may be a counselor, an instructor, or a researcher depending on the application in which the invention is used.

Observer—a user receiving information sent by the end user and the interactor and/or receiving digital representation of an avatar. Observer is capable of receiving information, but cannot send information via network to other communications points.

Notification warning—an automatically generated message outputted to the interactor when the interactor instructs the system to convey a culturally sensitive gesture to the end user through the avatar.

Unidirectional communications link—a communications channel that connects two or more communication points enabling one communications point to send information to a second communications point, wherein the second communications point is only capable of receiving the information.

What is claimed is:

1. One or more non-transitory tangible computer-readable media having computer-executable instructions for performing a method by running a software program on a computer, the computer operating under an operating system, the method including issuing instructions from the software program to perform a series of steps comprising:
   authenticating an end user at a first communications point and an interactor at a second communications point;
   establishing a first bidirectional communications link between the first communications point and the second communications point;
   electronically outputting to the end user a plurality of culturally distinct anthropomorphic avatars to be controlled by the interactor;
   receiving the end user selection of one of the plurality of anthropomorphic avatars;
   automatically setting a cultural profile for the end user based on the selected avatar, the cultural profile representative of attributes of the end user including race, gender, and ethnicity;
   filtering a plurality of predefined gestures in a gesture database based on the cultural profile to identify culturally sensitive gestures;
   receiving a first gesture from the interactor at the second communications point;
   comparing the first gesture against the gesture database;
   responsive to the first gesture being identified as culturally sensitive, retrieving a substitute second gesture; and
   digitally conveying the second gesture to the end user at the first communications point through the selected avatar.

2. The media of claim 1, further comprising the step of responsive to the first gesture being identified as culturally sensitive, outputting a notification warning to the interactor at the second communications point.

3. The media of claim 1, further comprising the step of responsive to the first gesture being identified as culturally sensitive, receiving an input from the interactor on whether to convey the first gesture or a substitute second gesture to the end user at the first communications point through the selected avatar.

4. The media of claim 1, further comprising the step of responsive to the first gesture not being identified as culturally sensitive, conveying the first gesture to the end user at the first communications point through the selected avatar.

5. The media of claim 1, further comprising the step of automatically selecting the first gesture based on an input received from the interactor.

6. The media of claim 1, further comprising the step of establishing a second unidirectional communications link between the first communications point and the second communications point, the second unidirectional communications link displaying gestures of the avatar to the end user.

7. The media of claim 1, wherein the first gesture is selected from a list of predefined gestures.

8. The media of claim 1, wherein the first gesture is detected by a motion sensor.

9. The media of claim 1, wherein the bidirectional communications link is selected from the group consisting of text, audio, and video.

10. The media of claim 1, further comprising the step of establishing a unidirectional communications link between the end user at the first communications point and an observer at a third communications point, whereby the unidirectional communications link digitally transmits gestures of the avatar to the observer.

11. The system of claim 1 further comprising the step of establishing a unidirectional communications link between the end user at the first communications point and an observer at a third communications point, whereby the unidirectional communications link transmits audio associated with the end user and the avatar to the observer.

12. A system for culturally sensitive avatar interaction comprising:
- a first communications point associated with an end user and a second communications point associated with an interactor, the interactor partially or fully controlling an anthropomorphic avatar from the second communications point, and the avatar is selected by the end user and digitally displayed to the end user at the first communications point;
- a first bidirectional communications link between the first communications point and the second communications point, the first bidirectional communications link is selected from the group consisting of text, audio, and video;
- a second unidirectional communications link between the first communications point and the second communications point, the second unidirectional communications link displaying movements and expressions of the avatar to the end user;
- a cultural profile applied to the end user at the first communications point, the cultural profile representative of attributes of the end user including race, gender, and ethnicity;
- a data store of culturally sensitive interaction profiles associated with the cultural profile applied to the end user, the culturally sensitive interactions selected from the group consisting of gestures, poses, dress, and dialog conveyed by the interactor through the avatar;
- a non-transitory, computer readable media storing instructions to automatically detect culturally sensitive interactions invoked by the interactor through the avatar according to the cultural profile; and
- a notification warning generated responsive to the detection of a culturally sensitive interaction.

13. The system of claim 12 further comprising instructions to automatically suppress culturally offensive interactions invoked by the interactor before conveyance the avatar to the end user.

14. The system of claim 12 further comprising instructions to automatically translate culturally offensive interactions invoked by the interactor to culturally benign interactions whereby the avatar displays the culturally benign interaction to the end user.

15. The system of claim 12 further comprising instructions to automatically translate culturally ambiguous interactions invoked by the interactor to a culturally determinative interaction as selected by the interactor whereby the avatar displays the culturally determinative interaction to the end user.

16. The system of claim 12 further comprising a third communications point associated with an observer and a second unidirectional communications link between the first communications point and the third communications point, whereby the unidirectional communications link transmits movements and expressions of the avatar to the observer.

17. The system of claim 12 further comprising a second unidirectional communications link between the end user at the first communications point and an observer at a third communications point, whereby the unidirectional communications link transmits audio associated with the end user and the avatar to the observer.

18. The system of claim 12 further comprising instructions to receive an input from the interactor on whether to convey a detected culturally sensitive interaction or a substitute culturally benign interaction to the end user at the first communications point through the avatar.

19. The system of claim 12, further comprising instructions to automatically set a cultural profile for the end user based on the selected avatar.

\* \* \* \* \*